Patented Jan. 10, 1933

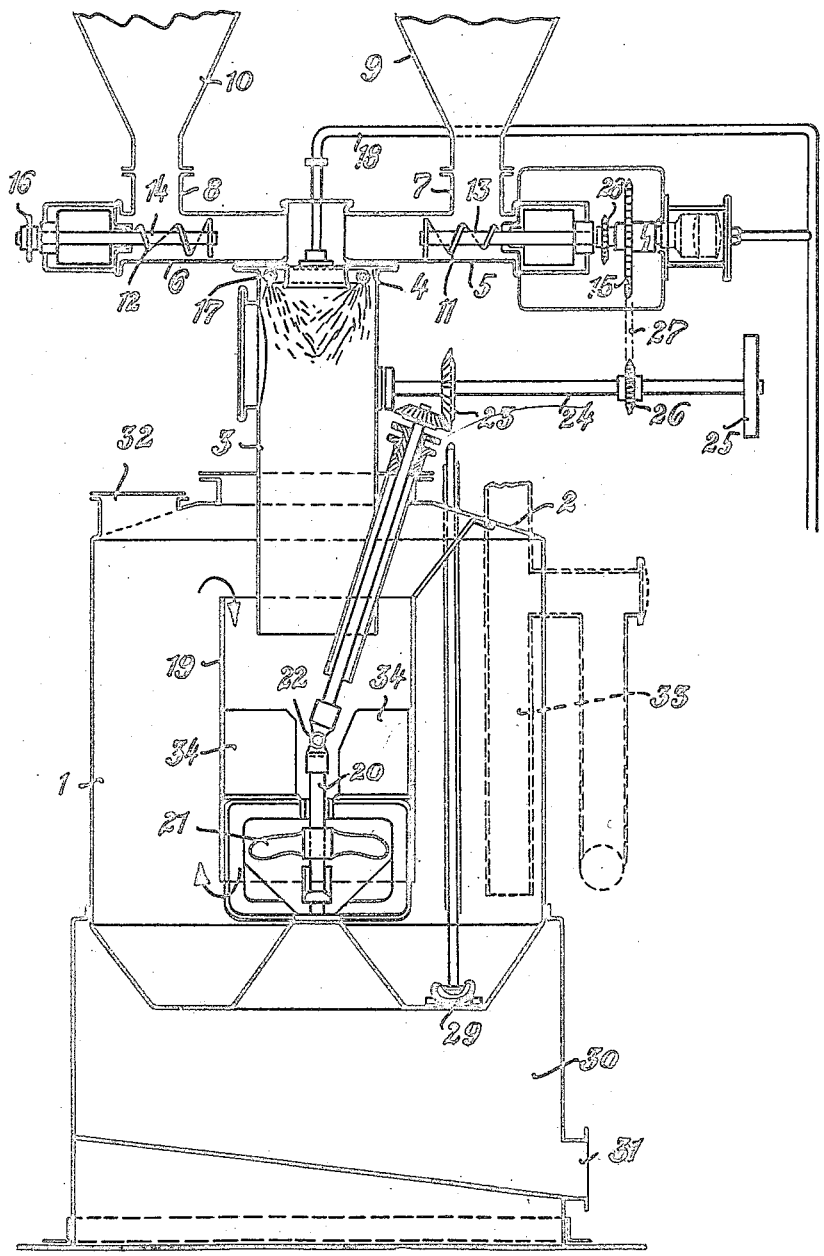

1,893,777

UNITED STATES PATENT OFFICE

PETER KEUSEN, OF DUSSELDORF, GERMANY, ASSIGNOR TO AUTOGENWERK SIRIUS GESELLSCHAFT MIT BESCHRÄNKTER HAFTUNG, OF DUSSELDORF-ELLER, GERMANY, A CORPORATION

PRODUCTION OF GASES FROM CARBIDES AND WATER

Application filed January 9, 1930, Serial No. 419,624, and in Germany May 15, 1929.

An application has been filed in Germany on May 15, 1929.

The generation of acetylene from carbide powder and granulated carbide has the disadvantage that an extremely rapid generation of gas is caused by the contact of the small carbide particles with the water and the particles themselves are so strongly heated that they become incandescent, which may cause an explosion should air happen to be present in the generator. According to the present invention acetylene is generated without danger using finely divided carbide, by introducing the carbide dust or granules in comparatively small quantities into the generator from above and simultaneously spraying it from all sides with penetrating water jets and so washing it down. The carbide together with the water arrives at the surface of the water in the generator and immediately passes beneath the surface thereof partly owing to the action of the jets and partly owing to a circulation produced in the water. In this manner an efficient cooling of the carbide is effected and this primarily prevents the carbide particles from becoming incandescent.

The arrangement for carrying out the process comprises one or more conveyor devices preferably in the form of conveyor screws which convey the carbide from a supply chamber or reservoir to an aperture provided in a tube arranged at the top of the generator. Water jet nozzles are disposed beneath this aperture and the jets therefrom penetrate the falling carbide and cause it to pass with a certain velocity into the water in the generator. The water in the generator is caused to circulate in a vertical sense by means of a pump or the like so that the falling carbide particles are immediately drawn beneath the surface of the water and remain submerged, the risk of explosion being thus excluded.

One constructional form of such an arrangement is represented in longitudinal section in the accompanying drawing.

The generator is indicated by 1. The admission aperture 4 for the carbide powder is provided in a tube 3 carried in the upper closure 2 of the generator. Two horizontal tubes 5 and 6 lead to this aperture and are connected with the hoppers 9 and 10 by means of members 7 and 8 respectively. These hoppers are fed with carbide powder or granules from a larger reservoir or by means of any suitable supply device.

The conveyor screws 11 and 12, the shafts 13, 14 of which are driven by gear or chain wheels 15, 16 respectively, are housed in the tubes 5, 6.

The drop opening 4 is surrounded by a tube 17 provided with apertures or jets directed obliquely and downwardly from which water supplied to the tube through the pipe 18 can be sprayed.

A vertical tube 19 open top and bottom carrying a screw paddle 21 on a shaft 20 is disposed within the generator 1. The shaft 20 is rotated from a shaft 24 by way of bevel gearing 23 and a universal joint 22, the shaft 24 being driven from a driving motor by means of the belt pulley 25. The chain wheel 15 of the screw 11 is also driven from this shaft 24 by means of sprocket wheels 26 and 15 and chain 27. The sprocket wheel 16 of the other conveyor screw 12 is driven from a second shaft disposed behind the same and connected with the shaft 13 by means of the sprocket wheel 28 and a corresponding chain.

The generator 1 is provided at the bottom with a stone outlet 29 for permitting the removal of stones present in the carbide or other useless material and beneath this is disposed the stone trap 30 from which the stones are removed as occasion permits by way of the aperture 31.

The gas generated passes by way of the members 32 to the purifier and then to the gas system. Mud is removed by means of the lift tube 33 known per se.

The process is carried out in such manner that the carbide powder passing into the funnels 9 and 10 from the reservoir is passed to the drop opening 4 by the screws 11 and 12 in small quantities. The carbide falls vertically downwardly in the tube 3 and is here immediately surrounded by water from the water jets provided by the tube 17 and is thus washed down by this water. It passes into the further tube 19, the screw paddle 21 of which in rotating forces the water in the tube downwardly so that a vertical circulation occurs in the manner indicated by the arrows. In this manner it is ensured that the carbide remains submerged until the generation of acetylene is completed so that no incandescent carbide particles can pass into the gas space of the generator. The drive is effected from a motor, preferably an electric motor, which causes the pulley 25 and the corresponding shaft 24 to rotate. A coupling device is also provided for coupling the conveyor screws 11 and 12 with the drive subsequent to the moment when the water spray from the tube 17 commences and releases this coupling when the flow of water ceases.

Radial partitions 34 are provided in the tube 19 in order to prevent the water from receiving a rotary motion about the vertical axis of the device.

I claim

1. Apparatus for generating gas from carbide powder comprising a generator to contain water, a container for powdered carbide connected with the upper part of the generator, a device for feeding carbide from the container in small quantities to the point of introduction thereof into the generator, a device for supplying water jets to the powder during introduction into the generator, a tubular element open at both ends and supported in said generator in position to surround the downwardly directed stream of water, and a water impeller mounted in said generator to cause a downward circulation of the carbide through said tubular element.

2. Apparatus for generating gas from carbide powder comprising a generator to contain water, means for feeding carbide to the generator, a water jet arranged obliquely to immerse the carbide powder and carry it into the generator, impeller means for circulating the water of said jet with the entrained powder beneath the surface of the water in the generator, and baffles adjacent said impeller to prevent swirling of the water in said generator.

3. Apparatus for generating gas from carbide powder comprising a generator to contain water, means for feeding carbide to the generator, a water jet arranged obliquely to entrain and immerse the carbide powder and carry it into the generator, a tubular member open at both ends and supported within the generator, impeller means for circulating the water of said jet with the entrained powder downwardly through said tubular member, thereby to carry it beneath the surface of the water in the generator, and baffles within the tubular member adjacent said impeller to prevent swirling of the water circulated through such tubular member.

4. An apparatus for generating gas from carbide powder comprising a water containing generator, a container for powdered carbide connected to the upper part of said generator, a device for feeding carbide from the container to the point of introduction thereof into the generator and a means for supplying an enveloping stream of water to the powder during introduction into the generator, an impeller means for vertically circulating the water in the generator and stationary vanes adjacent said impeller for preventing a rotary motion of said water current.

In testimony that I claim the foregoing as my invention, I have signed my name.

PETER KEUSEN.